(12) United States Patent
Zhang (10) Patent No.: US 12,470,813 B2
(45) Date of Patent: Nov. 11, 2025

(54) WIRELESS CHARGING CAMERA

(71) Applicant: Hangzhou Denghong Technology Co., Ltd., Hangzhou (CN)

(72) Inventor: Zhiyong Zhang, Hangzhou (CN)

(73) Assignee: Hangzhou Denghong Technology Co., Ltd., Hangzhou (CN)

( * ) Notice: Subject to any disclaimer, the term of this patent is extended or adjusted under 35 U.S.C. 154(b) by 247 days.

(21) Appl. No.: 18/197,690

(22) Filed: May 15, 2023

(65) Prior Publication Data

US 2023/0388627 A1    Nov. 30, 2023

(30) Foreign Application Priority Data

May 31, 2022  (CN) .......................... 202221340217.3

(51) Int. Cl.
*H04N 23/65* (2023.01)
*H02J 50/00* (2016.01)
*H02J 50/10* (2016.01)
*H04N 23/54* (2023.01)

(52) U.S. Cl.
CPC ........... *H04N 23/65* (2023.01); *H02J 50/005* (2020.01); *H02J 50/10* (2016.02); *H04N 23/54* (2023.01)

(58) Field of Classification Search
CPC ........ H04N 23/65; H04N 23/54; H04N 23/50; H04N 23/51; H02J 50/005; H02J 50/10; H02J 7/0042; H02J 7/0044; H02J 50/90
See application file for complete search history.

(56) References Cited

U.S. PATENT DOCUMENTS

| | | | | |
|---|---|---|---|---|
| 11,412,149 | B1* | 8/2022 | Gandhi | H04N 23/687 |
| 12,069,356 | B2* | 8/2024 | Files | G06F 1/3231 |
| 12,200,328 | B2* | 1/2025 | Files | G06F 1/1632 |
| 2011/0260681 | A1* | 10/2011 | Guccione | H02J 7/342 |
| | | | | 320/108 |
| 2017/0085757 | A1* | 3/2017 | Ramones | H04N 23/55 |
| 2017/0339343 | A1* | 11/2017 | Zhang | H04B 5/79 |
| 2018/0007331 | A1* | 1/2018 | Levcovich | H04N 23/84 |
| 2019/0215423 | A1* | 7/2019 | Ortiz | H04N 23/51 |
| 2019/0246074 | A1* | 8/2019 | Sebree | H04N 23/51 |
| 2019/0373214 | A1* | 12/2019 | Gurr | H04N 23/62 |
| 2020/0201144 | A1* | 6/2020 | Ramones | H04M 1/72409 |
| 2020/0227954 | A1* | 7/2020 | Ding | H02J 50/10 |
| 2020/0314299 | A1* | 10/2020 | Okuley | H04N 7/144 |
| 2020/0358931 | A1* | 11/2020 | Jenkinson | G03B 17/08 |

(Continued)

*Primary Examiner* — Twyler L Haskins
*Assistant Examiner* — John H Morehead, III
(74) *Attorney, Agent, or Firm* — Mahamedi IP Law LLP (57) ABSTRACT

The present application discloses a wireless charging camera comprising a camera and a magnetically attractive wireless charging base; the camera comprises a housing, a photosensor, a white light lens, a pickup, an indicator light, a lens module, a PIR lens and a speaker are arranged on front face of the housing, and a control motherboard, a wireless charging receiving induction coil module, a rechargeable battery module and an iron pot are arranged inside the housing; the magnetically attractive wireless charging base comprises an upper housing of the charging base, a lower housing of the charging base, a wireless charging transmitting induction coil module, a permanent magnet, a charging base foot pad, a control board, an electromagnet module and an integrated power cord of a control panel cable.

7 Claims, 8 Drawing Sheets

(56) References Cited

U.S. PATENT DOCUMENTS

| | | | |
|---|---|---|---|
| 2022/0100281 A1* | 3/2022 | Nocon | G06F 3/0346 |
| 2022/0109782 A1* | 4/2022 | Yu | G06F 1/1618 |
| 2022/0217273 A1* | 7/2022 | Vinahradau | G08B 13/19632 |
| 2023/0045803 A1* | 2/2023 | Wallace | H04N 23/51 |

* cited by examiner

WIRELESS CHARGING CAMERA

CROSS REFERENCE TO RELATED APPLICATION

This application claims priority to Chinese Patent Application No. 202221340217.3, filed on May 31, 2022, and entitled "A Wireless Charging Camera", the entire contents of which are incorporated herein by reference.

TECHNICAL FIELD

The present application relates to the technical field of security monitoring, and more particularly, to a wireless charging camera.

BACKGROUND

Figure 8:
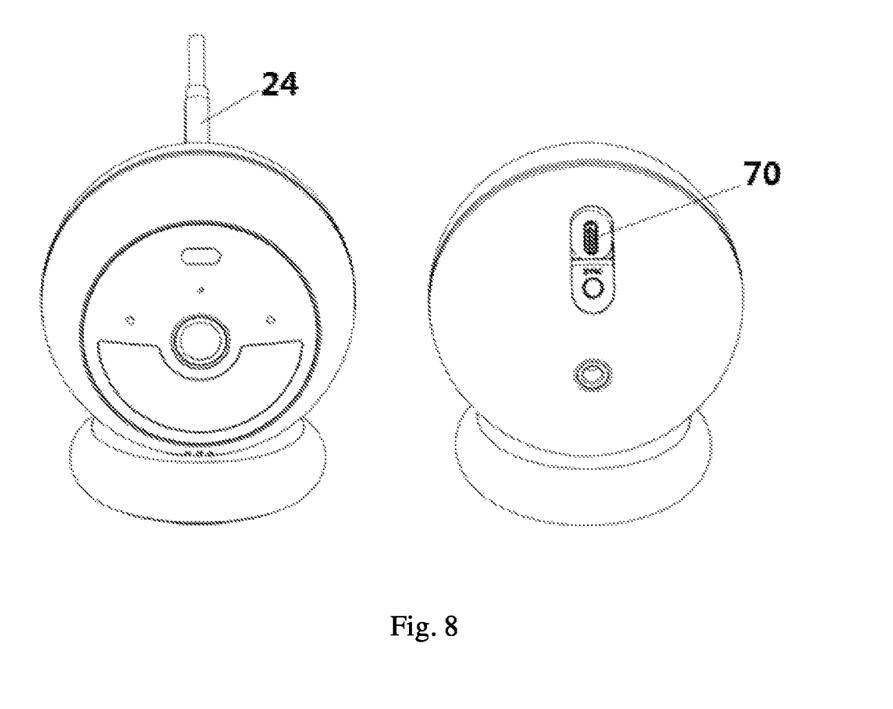
FIG. 8 is a structural schematic diagram of the prior art of the present application.

With the progress of science and technology, surveillance cameras have become ubiquitous in our lives, and the experience of using cameras is constantly improving. Most of the existing cameras achieve continuous power supply to the camera through the power cord self-contained in the camera body or the reserved power interface on the camera body, or charge the battery inside the equipment with a wire, as illustrated in FIG. 8.

The existing ways have the following disadvantages:

Disadvantages 1: when the camera needs to be adjusted to shoot at a certain angle, the power cord connected to the camera body will have a certain pulling force on the camera body, which will cause the camera to shift, thus affecting the camera's shooting of the target scene, and it is even more impossible to shoot any target scene;

Disadvantage 2: the power cord self-contained in the camera body needs to be waterproof by dispensing glue or other means; The reserved power interface on the camera body needs to be waterproof by adding an external waterproof cover, and both of these waterproof methods have a certain probability of causing water to enter the interior of the camera, thus affecting the normal shooting of the camera;

Disadvantage 3: the camera has a self-contained power cord or a reserved power interface, which will have a certain impact on the camera layout, especially on appearance.

SUMMARY

The purpose of the present application is to provide a wireless charging camera, which aims to effectively solve the influence of displacement caused by the power cord pulling of the camera, and satisfy the shooting of any target scene by the camera; the camera of this technical solution does not need to be provided with a power cord or a power interface, such that the problem of camera water penetration may be effectively solved; at the same time, it effectively solves the layout problem of the camera and ensures the integrity of the appearance to the greatest extent.

To achieve the above purpose, the present application provides the following technical scheme: a wireless charging camera comprising a camera and a magnetically attractive wireless charging base;

The camera comprises a housing, a photo-sensor, a white light lens, a pickup, an indicator light, a lens module, a PIR lens and a speaker are arranged on front face of the housing, and a control motherboard, a wireless charging receiving induction coil module, a rechargeable battery module and an iron pot are arranged inside the housing;

The magnetically attractive wireless charging base comprises an upper housing of the charging base, a lower housing of the charging base, a wireless charging transmitting induction coil module, a permanent magnet, a charging base foot pad, a control board, an electromagnet module and an integrated power cord of a control panel cable; wherein the integrated power cord can be replaced by the combination of a power interface and an independent power cord, the permanent magnet can be replaced by a charged coil.

In some embodiments, the iron pot comprises an arc-shaped curved surface and an outstretched straight arm, the arc-shaped curved surface is in contact with inner wall of the housing.

In some embodiments, the wireless charging receiving induction coil module comprises a wireless charging receiving induction coil I, a wireless charging receiving induction coil II and a wireless charging receiving induction coil III, which are connected in pairs and arranged on inner wall of the iron pot.

In some embodiments, when the camera is close to the magnetically attractive wireless charging base, an arc convex surface of the housing of the camera is in contact with an arc concave surface of the upper housing of the charging base of the magnetically attractive wireless charging base, and at the same time, the iron pot and the permanent magnet generate attraction through magnetic attraction to fix the camera at a required position.

In some embodiments, when the magnetically attractive wireless charging base is connected to a power supply through the integrated power cord, the wireless charging transmitting induction coil module inside thereof emits a magnetic field under the control of the control board, and the wireless charging receiving induction coil module induces the magnetic field and generates a current under the control of the control motherboard, such that continuously charges the rechargeable battery module, and when the camera needs to be adjusted to a different angle, the rechargeable battery module can be continuously charged as long as any one of the three sub-coils of the wireless charging receiving induction coil module receives the induction magnetic field.

In some embodiments, the magnetically attractive wireless charging base is equipped with a quick installation plate, and a double-sided adhesive tape is stuck on the surface of the quick installation plate, such that the magnetically attractive wireless charging base is able to be fixed on a wall or a glass surface that cannot be screwed.

In some embodiments, the quick installation plate is provided with a mounting hole, and on both sides of the outer wall of the quick installation plate are respectively provided with a buckle position I and a buckle position II, and the quick fixing is realized through cooperation of a buckle position arranged on the lower housing of the charging base, the buckle position I and the buckle position II.

In some embodiments, the electromagnet module is arranged around the permanent magnet, and the electromagnet module comprises N electromagnet units with the same function, and each electromagnet unit can be independently controlled and operated by a control board, when the camera is fixed by magnetic attraction generated by the iron pot and the permanent magnet, one or more electromagnet units are started to work through the control board, at this time, the magnetic force is generated at the already started electromagnet units, and the strong magnetic force will cause the fixed position of the camera to rotate.

The wireless charging camera provided by the present application has beneficial effects of:
1. realizing wireless charging of the camera by the charging base;
2. when the charging base charges the camera, the camera body may be manually adjusted to any angle on the charging base to shoot;
3. when the charging base charges the camera, the camera body may automatically adjust the angle on the charging base to shoot by controlling the electromagnet module unit.
4. solving the waterproof hidden trouble at the power cord or power interface of the camera, improving the stability of the camera, and also improving the adaptive experience of users;
5. realizing magnetic attraction fixation of the camera by replacing the permanent magnet with a charged coil.

To sum up, the present application effectively solves the influence of displacement caused by the power cord pulling of the camera, and satisfy the shooting of any target scene by the camera; the camera of the present application does not need to be provided with a power cord and a power interface, such that the problem of camera water penetration may be effectively solved; at the same time, it effectively solves the layout problem of the camera and ensures the integrity of the appearance to the greatest extent.

In the drawings: 1-camera, 11-photo-sensor, 12-white light lens, 13-pickup, 14-indicator light, 15-lens module, 16-PIR lens, 17-speaker, 18-control motherboard, 30-wireless charging receiving induction coil module, 31-wireless charging receiving induction coil I, 32-wireless charging receiving induction coil II, 33-wireless charging receiving induction coil III, 40-rechargeable battery module, 42-iron pot, 421-arc-shaped curved surface, 422-outstretched straight arm, 43-housing, 2-magnetically attractive wireless charging base, 21-upper housing of the charging base, 22-lower housing of the charging base, 221-buckle position, 23-wireless charging transmitting induction coil module, 24-integrated power cord, 25-permanent magnet, 26-charging base foot pad, 27-control board, 28-electromagnet module, 281-electromagnet units, 50-installation plate, 51-buckle position I, 52-buckle position II, 53-mounting holes, 54-surface, 60-double-sided adhesive tape; 70-power interface.

DETAILED DESCRIPTION OF EMBODIMENTS

The technical scheme in the embodiment of the present application will be described clearly and completely in accordance with the attached drawings. Obviously, the embodiments described herein are only a partial rather than all embodiments of the present application. Based on the embodiments of the present application, all other embodiments obtained by an ordinary skilled person in the art without creative effort belong to the protection scope of the present application.

Figure 1:
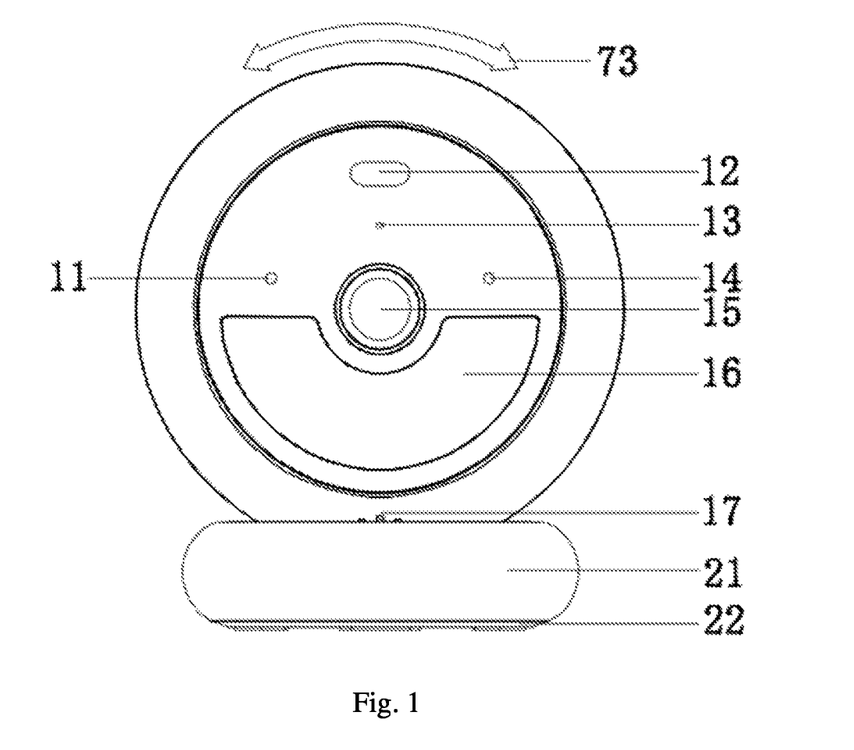
FIG. 1 is a structural schematic diagram of the present application.
Figure 2:
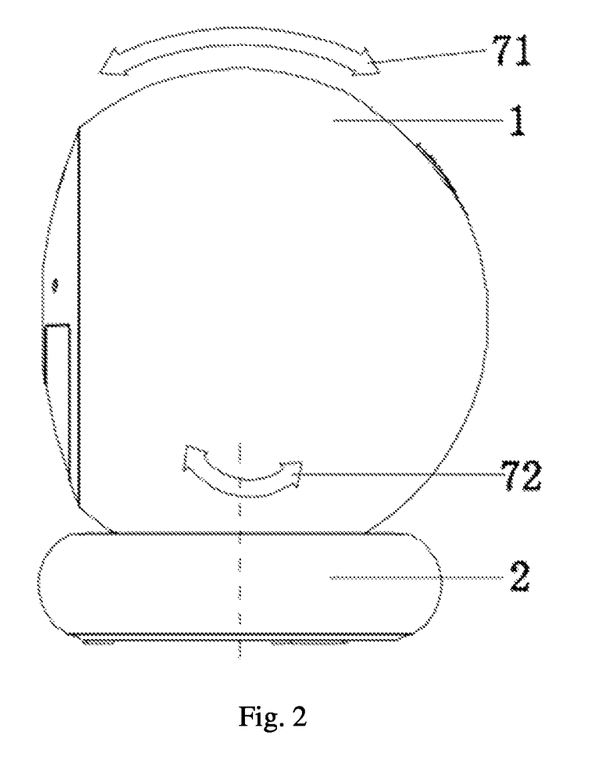
FIG. 2 is a schematic diagram of the side structure of the present application.
Figure 3:
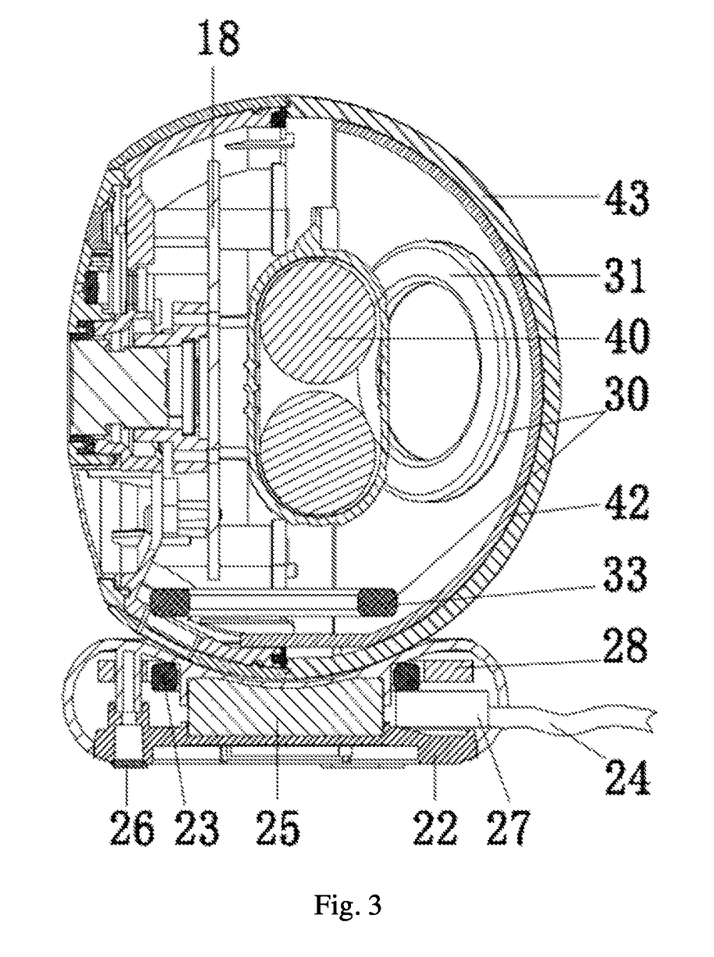
FIG. 3 is a sectional view of the present application.
Figure 5:
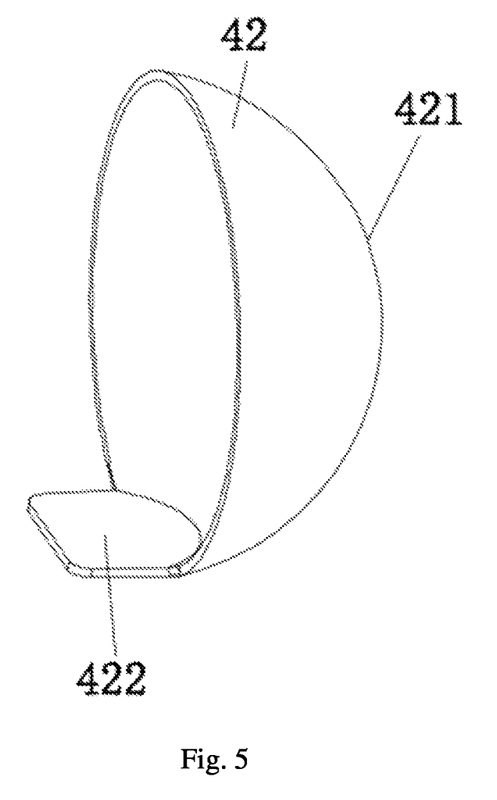
FIG. 5 is a schematic structural diagram of the iron pot of the present application.

Referring to FIGS. 1-3, the present application provides a technical scheme: a wireless charging camera device comprising a camera 1 and a magnetically attractive wireless charging base 2;

More specifically, as illustrated in FIGS. 2 and 3: the camera 1 comprises a housing 43, a photo-sensor 11, a white light lens 12, a pickup 13, an indicator light 14, a lens module 15, a PIR lens 16 and a speaker 17 are arranged on front face of the housing 43, and a control motherboard 18, a wireless charging receiving induction coil module 30, a rechargeable battery module 40 and an iron pot 42 are arranged inside the housing 43;

Further, as illustrated in FIG. 5, the iron pot 42 comprises an arc-shaped curved surface 421 and an outstretched straight arm 422.

Figure 4:
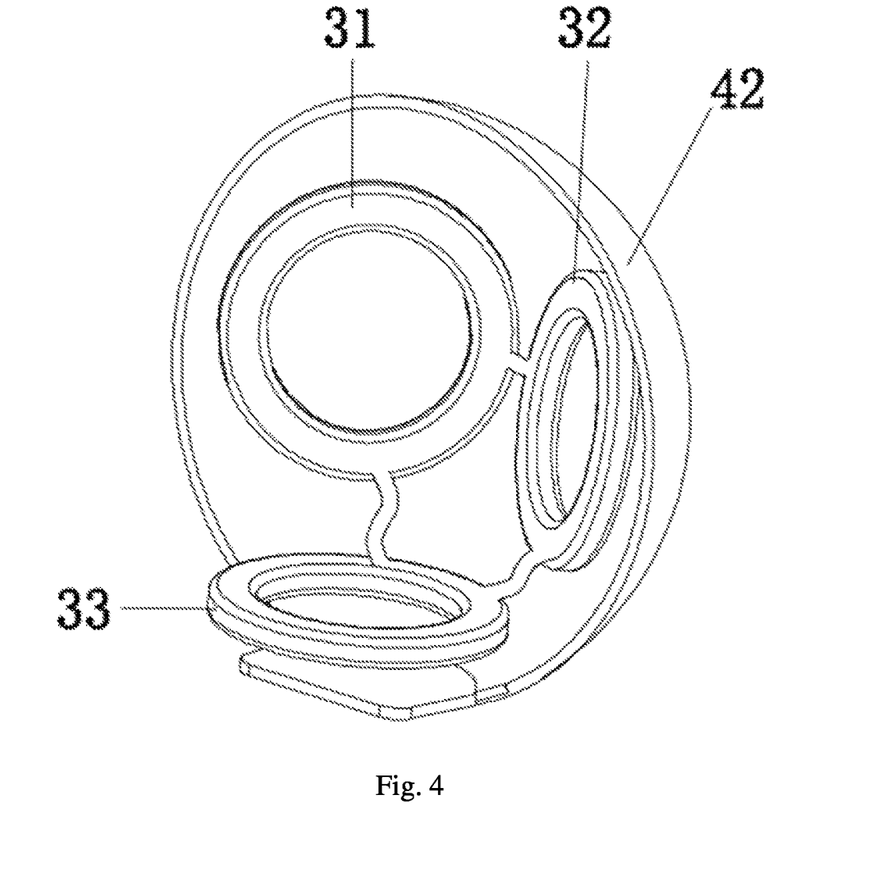
FIG. 4 is a schematic structural diagram of the wireless charging receiving induction coil module of the present application.

More specifically, as illustrated in FIG. 4, the wireless charging receiving induction coil module 30 comprises a wireless charging receiving induction coil I 31, a wireless charging receiving induction coil II 32 and a wireless charging receiving induction coil III 33, three sub-coils are connected in pairs, and each induction coil can work independently, however, the scheme is only a way to implement the embodiment set forth herein, the wireless charging receiving induction coil module as used in this scheme is not limited to comprising three sub-coils, and it can comprise N sub-coils, wherein N is a multiple of 1.

More specifically, as illustrated in FIGS. 2 and 3, the magnetically attractive wireless charging base 2 comprises an upper housing 21 of the charging base, a lower housing 22 of the charging base, a wireless charging transmitting induction coil module 23, a permanent magnet 25, a charging base foot pad 26, a control board 27, an electromagnet module 28 and an integrated power cord 24 of a control panel cable; wherein the integrated power cord 24 can be replaced by the combination of a power interface (USB interface, TYPE-C interface, etc.) and an independent power cord, the permanent magnet 25 can be replaced by a charged coil.

Further, when the camera 1 is close to the magnetically attractive wireless charging base 2, an arc convex surface of the housing 43 of the camera 1 is in contact with an arc concave surface of the upper housing 21 of the charging base of the magnetically attractive wireless charging base 2, and at the same time, the iron pot 42 and the permanent magnet 25 generate attraction through magnetic attraction to fix the camera 1 at a required position; and when the magnetically attractive wireless charging base 2 is connected to a power supply through the integrated power cord, the wireless charging transmitting induction coil module 23 inside thereof emits a magnetic field under the control of the control board 27, and the wireless charging receiving induction coil module 30 induces the magnetic field and generates a current under the control of the control motherboard 18, such that continuously charges the rechargeable battery module 40, and when the camera 1 needs to be adjusted to a different angle, the rechargeable battery module 40 can be continuously charged as long as any one of the three sub-coils of the wireless charging receiving induction coil module 30 receives the induction magnetic field.

Figure 7:
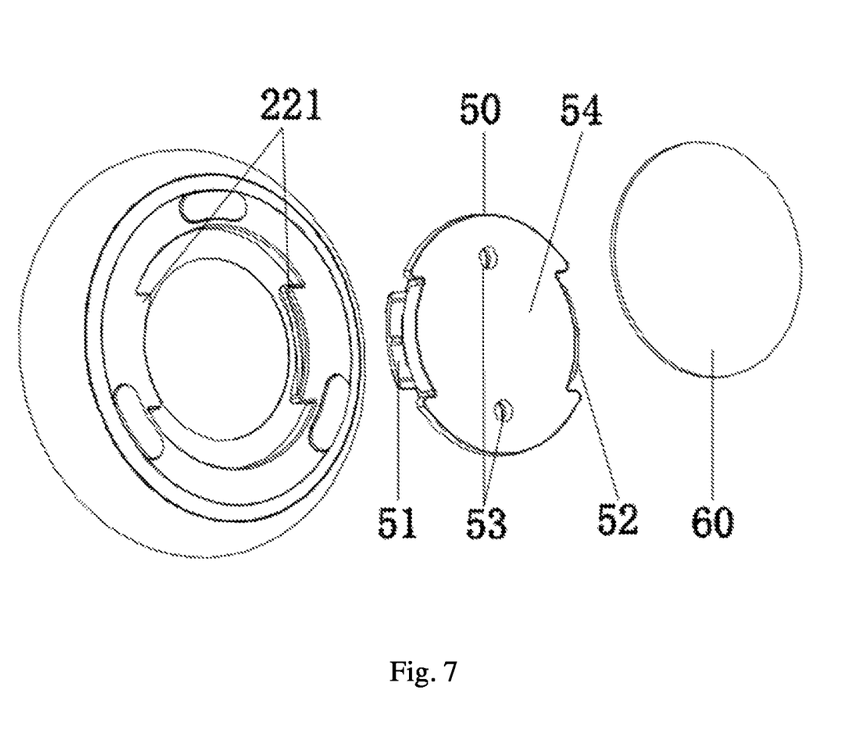
FIG. 7 is a schematic structural diagram of the quick installation plate of the present application.

More specifically, as illustrated in FIG. 7, the magnetically attractive wireless charging base 2 is equipped with a quick installation plate 50, and a double-sided adhesive tape 60 is stuck on the surface 54 of the quick installation plate 50, such that the magnetically attractive wireless charging base 2 is able to be fixed on a wall or a glass surface that cannot be screwed.

The quick installation plate 50 is provided with a mounting hole 53, and on both sides of the outer wall of the quick installation plate 50 are respectively provided with a buckle position I 51 and a buckle position II 52, and the quick fixing is realized through the cooperation of a buckle position 221 arranged on the lower housing 22 of the charging base, the buckle position I 51 and the buckle position II 52.

Further, as illustrated in FIG. 8: the magnetically attractive wireless charging base 2 can realize the installation and fixing methods in various scenarios, mainly comprising:

1). Placed directly on the desktop;
2). Directly adsorbed on the iron surface (such as iron cabinets, iron plates, etc.) by magnetic force.
3). Firstly, it is fixed on the ceiling or vertical wall by passing screws through the mounting holes 53 on the quick installation plate 50, and then it is quickly fixed by the buckle position on the lower housing 22 of the charging base and the buckle position I 51 and the buckle position II 52 on the quick installation plate 50.
4). The magnetically attractive wireless charging base 2 is fixed on a wall or glass surface that cannot be screwed by pasting the double-sided adhesive tape 60 on the surface 54 of the quick installation plate 50.

The detailed connection method thereof is a well-known technology in the field, and the described hereinafter mainly introduces the working principle and process, not explaining the electrical control anymore.

Figure 6:
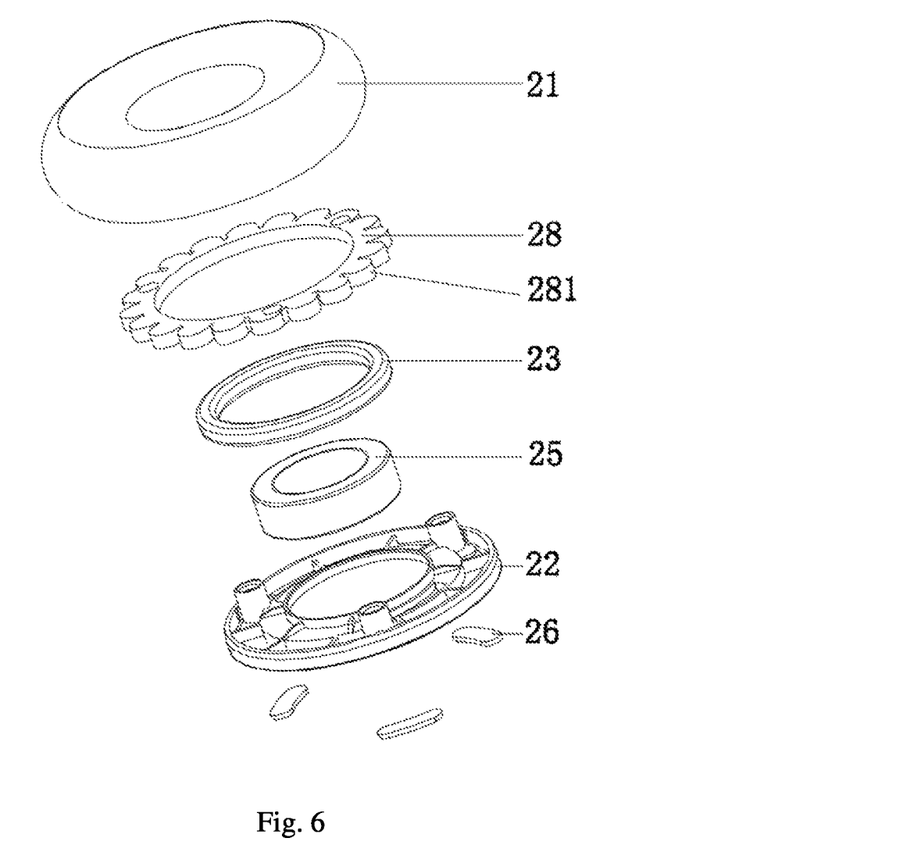
FIG. 6 is a schematic structural diagram of the electromagnet module of the present application.

The magnetically attractive wireless charging base 2 is electrified with an external power supply through an integrated power cord 24 or a power interface 70, and the wireless charging transmitting induction coil module 23 inside the magnetically attractive wireless charging base 2 generates an induction to the wireless charging receiving induction coil module 30 inside the camera 1, and under the control of the control motherboard 18, charges the rechargeable battery module 40 connected with the wireless charging receiving induction coil module 30 and stores electric energy; Finally the continuous power supply to the camera 1 is realized, and the normal operation of the camera is guaranteed;

When the magnetically attractive wireless charging base 2 continuously charges the camera 1, the magnetically attractive wireless charging base 2 is fixed at a required position in any one of the above ways (four ways described hereinabove), when the camera 1 is close to the magnetically attractive wireless charging base 2, an arc convex surface of the housing 43 of the camera 1 is in contact with an arc concave surface of the upper housing 21 of the charging base of the magnetically attractive wireless charging base 2, and at the same time, the iron pot 42 and the permanent magnet 25 generate attraction through magnetic attraction to fix the camera 1 at a required position; When the camera 1 needs to change the shooting angle, just rotate the camera 1 and make the surface of the iron pot 42 cover the permanent magnet 25 to generate enough magnetic attraction, such that realizing three-axis step-less adjustment in vertical direction 71, horizontal direction 72, and rotation direction 73 and fix it at the required position, thereby meeting the requirement that the camera can shoot scenes at any angle;

On the basis of realizing the above technology, the present case can also realize automatic adjustment of camera shooting angle; the principle thereof is: the electromagnet module 28 is arranged around the permanent magnet 25, and the electromagnet module 28 comprises N electromagnet units 281 with the same function, and each electromagnet unit 281 can be independently controlled and operated by a control board 27, when the camera 1 is fixed at a certain position by magnetic attraction generated by the iron pot 42 and the permanent magnet 25, one or more electromagnet units 281 are started to work through the control board 27, at this time, very strong magnetic force is generated at the already started electromagnet units 281, and the strong magnetic force will cause the fixed position of the camera 1 to rotate, and by starting the electromagnet unit at different positions one or more times, the shooting angle of the camera can be automatically adjusted.

Although the embodiments of the present application have been shown and described, it will be understood by an ordinary skilled person in the art that many changes, modifications, substitutions and variations can be made to these embodiments without departing from the principle and spirit of the present application, and the scope of the present application is defined by the appended claims and their equivalents.

What is claimed is:

1. A wireless charging camera, comprising a camera and a magnetically attractive wireless charging base, wherein:
   the camera comprises a housing;
   a photo-sensor, an indicator light, a lens module, a PIR lens and a speaker are arranged on front face of the housing, and a control motherboard, a wireless charging receiving induction coil module, a rechargeable battery module and an iron pot are arranged inside the housing;
   the magnetically attractive wireless charging base comprises an upper housing of the charging base, a lower housing of the charging base, a wireless charging transmitting induction coil module, a permanent magnet, a charging base foot pad, a control board, an electromagnet module and an integrated power cord of a control panel cable; wherein the integrated power cord is a combination of a power interface and an independent power cord, the permanent magnet is a charged coil;
   wherein the wireless charging receiving induction coil module comprises a wireless charging receiving induction coil I, a wireless charging receiving induction coil II and a wireless charging receiving induction coil III, which are connected in pairs and arranged on inner wall of the iron pot.

2. The wireless charging camera of claim 1, wherein:
   the iron pot comprises an arc-shaped curved surface and an outstretched straight arm, the arc-shaped curved surface is in contact with inner wall of the housing.

3. The wireless charging camera of claim 1, wherein:
   when the camera is close to the magnetically attractive wireless charging base, an arc convex surface of the housing of the camera is in contact with an arc concave surface of the upper housing of the charging base of the magnetically attractive wireless charging base, and at the same time, the iron pot and the permanent magnet generate attraction through magnetic attraction to fix the camera at a required position.

4. The wireless charging camera of claim 1, wherein:
   when the magnetically attractive wireless charging base is connected to a power supply through the integrated power cord, the wireless charging transmitting induction coil module inside thereof emits a magnetic field under the control of the control board, and the wireless charging receiving induction coil module induces the magnetic field and generates a current under the control of the control motherboard, such that continuously charges the rechargeable battery module, and when the camera needs to be adjusted to a different angle, the rechargeable battery module is continuously charged as long as any one of the three sub-coils of the wireless charging receiving induction coil module receives the induction magnetic field.

5. The wireless charging camera of claim 1, wherein:
the magnetically attractive wireless charging base is equipped with a quick installation plate, and a double-sided adhesive tape is stuck on the surface of the quick installation plate, such that the magnetically attractive wireless charging base is able to be fixed on a wall or a glass surface that cannot be screwed.

6. The wireless charging camera of claim 5, wherein:
the quick installation plate is provided with a mounting hole, and on both sides of the outer wall of the quick installation plate are respectively provided with a buckle position I and a buckle position II, and a quick fixing is realized through cooperation of a buckle position arranged on the lower housing of the charging base, the buckle position I and the buckle position II.

7. The wireless charging camera of claim 1, wherein:
the electromagnet module is arranged around the permanent magnet, and the electromagnet module comprises a plurality of electromagnet units controlled by a control board, wherein each of the electromagnet units independently operated by the control board when the camera is fixed by magnetic attraction generated by the iron pot and the permanent magnet, one or more electromagnet units are started to work through the control board, at this time, the magnetic force is generated at the already started electromagnet units, and the magnetic force causes the camera to rotate.

* * * * *